Figure 1:
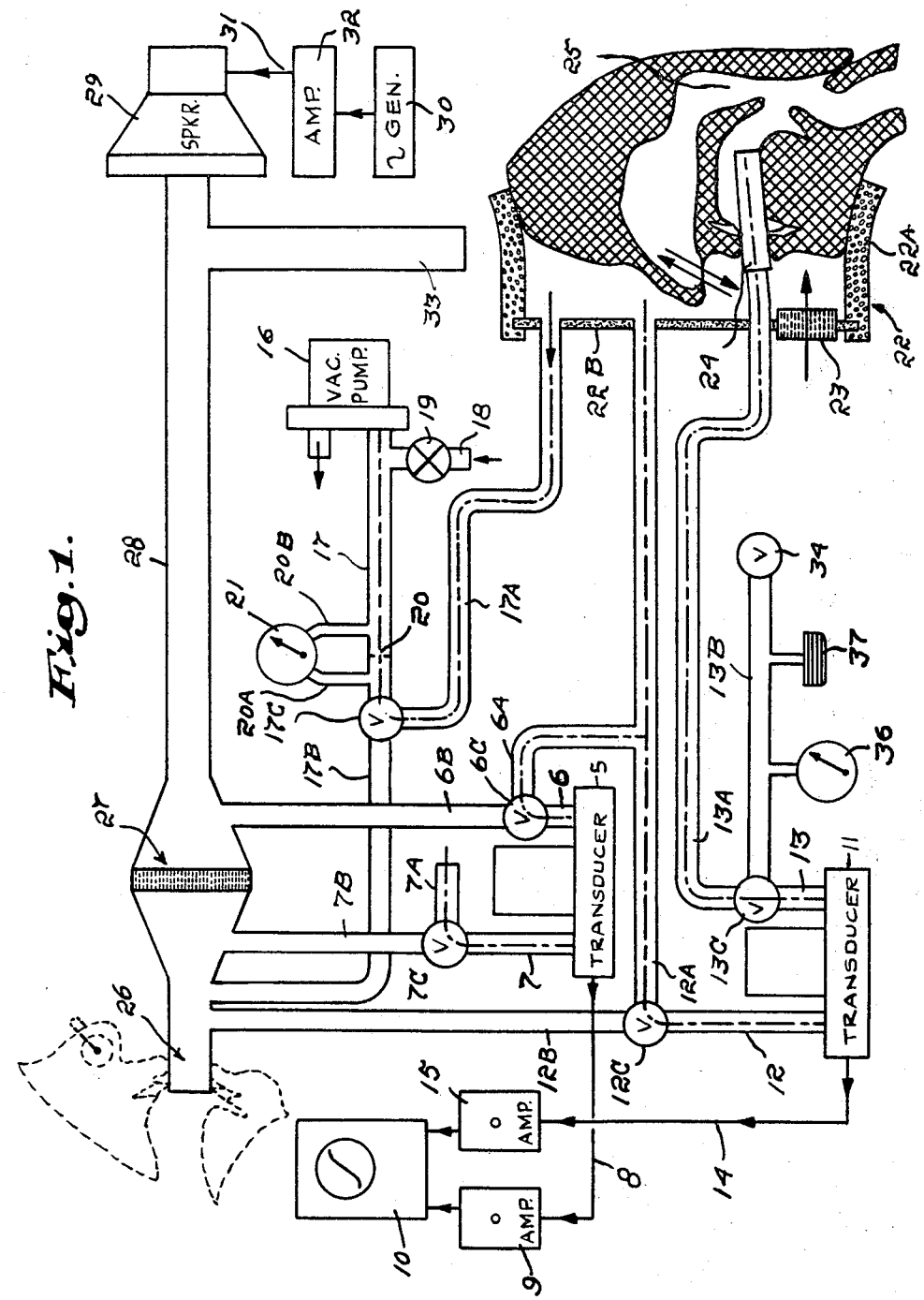

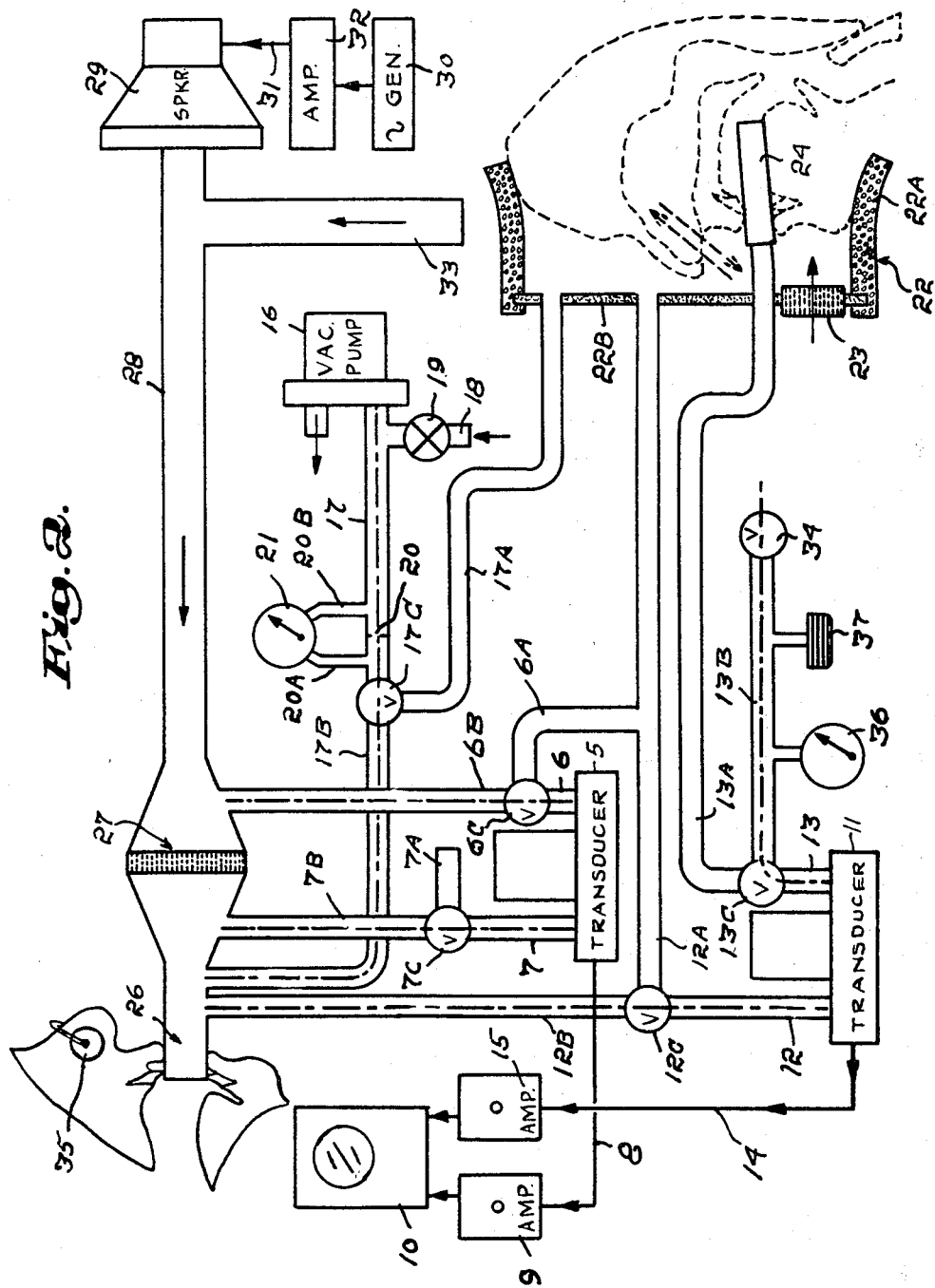

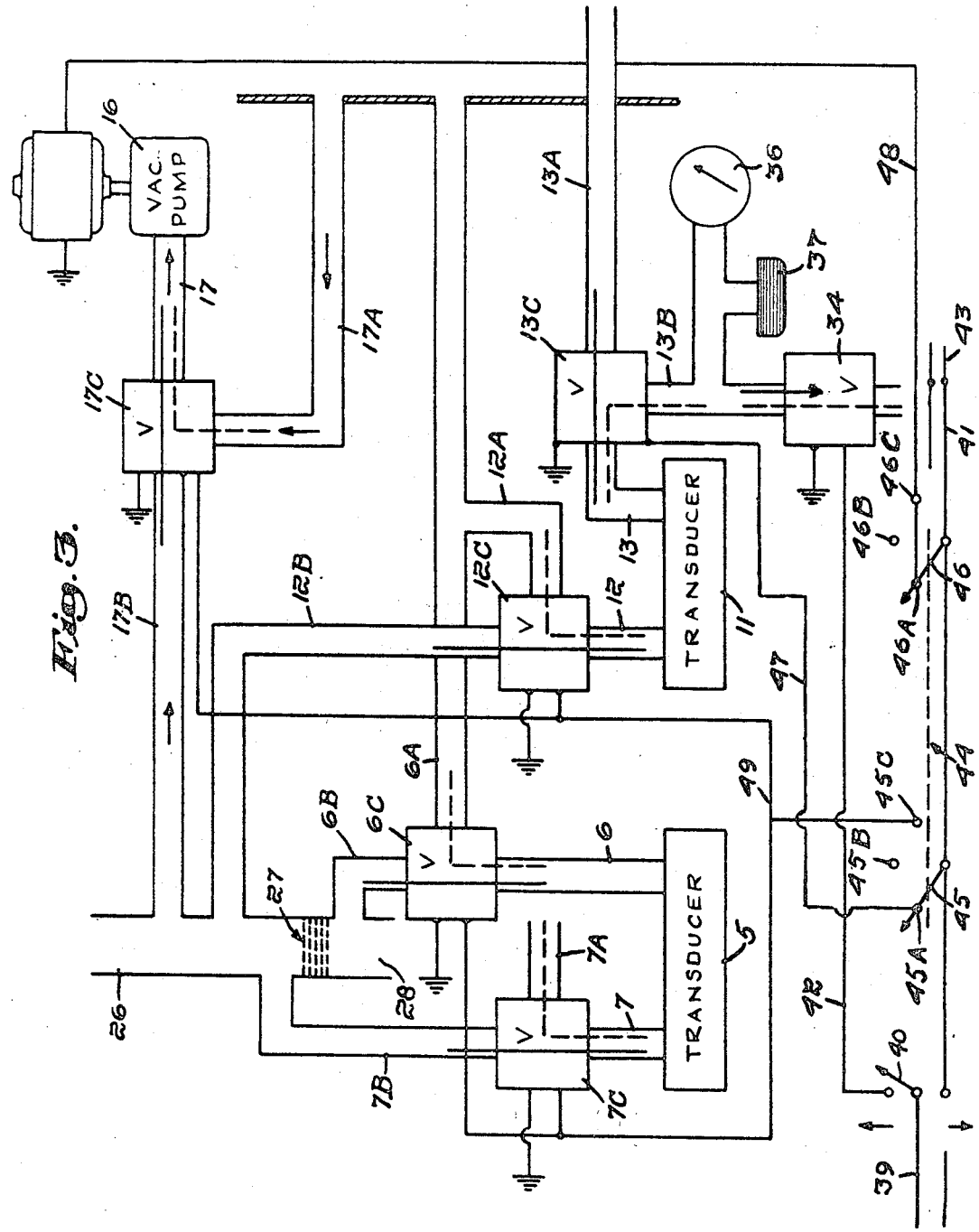

United States Patent Office 3,410,264
Patented Nov. 12, 1968

3,410,264
INSTRUMENT FOR MEASURING TOTAL RESPIRATORY AND NASAL AIR RESISTANCE
Willem Steven Frederik, 106 Suffolk Road,
Wellesley Hills, Mass. 02181
Filed June 2, 1966, Ser. No. 554,879
9 Claims. (Cl. 128—2)

The present invention relates to an instrument for measuring, alternatively, nasal air resistance and total respiratory air resistance.

The measurement of nasal air resistance as well as total respiratory air resistance on the same patient, at approximately the same time, is important to the clinical investigator interested, for example, in the evaluation of bronchodilators, anti-allergens, nasal decongestants, and antitussives. Both methods, hitherto performed with different instruments, are somewhat similar and to avoid the necessity of using two separate instruments and to ensure maximum convenience in use, the general objective of the invention is to provide a single instrument enabling both measurements to be taken in the alternative with the majority of the more expensive components being used in both measurements.

The determination of the flow resistance of any conductive system involves measuring simultaneously flow through the passage and the pressure drop or loss across it. In the case of nasal resistance measurements, the passages are the nasal passages and the pressure drop is the pressure difference between the external and internal pressures, the latter being taken in the nasopharynx.

Total respiratory flow resistance during mouth respiration, is the sum of the resistance of the anatomical components of the respiratory system and include the lower airway, upper airway, chest wall and pulmonary tissue resistances. While the resistance of each such resistance factor may be evaluated separately, the practical advantages of measuring only the total respiratory flow resistance outweigh such disadvantages as where the main interest is in the influence of a drug on the lower airway resistance.

Such total respiratory resistance may be measured by producing, at the mouth, pressure oscillations at the approximate resonant frequency of the respiratory system. The resulting modulation of the respiratory flow is measured simultaneously with the pressure variations in the mouth with reference to atmosphere.

In both types of measurements, a pneumotachograph functions as a flow meter in conjunction with a pressure responsive transducer and the pressure difference is determined by means of a second such transducer responsive, in one case, to variations in the air pressure in the mouth with reference to atmospheric pressure and, in the other case, to variations in air pressure in the nasopharynx in relation to the air pressure inside a mask worn by the patient. In both types of measurements, electrical signals from the two transducers are amplified and delivered to a suitable recorder such as an oscilloscope or x–y recorder.

In more detail, an instrument in accordance with the invention includes a mask for use in one measurement, the mask having an inlet in the form of a first pneumotachograph. The instrument also has a mouthpiece for use in the other measurement, the mouthpiece having a second pneumotachograph interposed between it and means to generate and deliver to the mouthpiece pressure oscillations at the approximate resonant frequency of the respiratory system. First and second differential pressure transducers both have first and second end conduits and are operable to convert air pressure in their conduits into electrical signals which are amplified and fed to the recorder oscilloscope. The instrument also includes a pump having first and second branches and valve means in control thereof. Each transducer conduit also has first and second branches and valve means in control thereof.

The first and second branches of the first conduit of the first transducer are in communication, respectively, with the interior of the mask and the side of the second pneumotachograph adjacent the generating means. The first and second branches of the second conduit of the first transducer are, respectively, open to atmosphere and in communication with the other side of the second pneumotachograph. The first and second branches of the first conduit of the second transducer are in communication, respectively, with the interior of the mask and with the mouthpiece. The first branch of the second conduit of the second transducer includes an oral probe and the second branch thereof opens to atmosphere. The first and second branches of the pump inlet are in communication, respectively, with the interior of the mask and the mouthpiece.

The valve means include positions placing either all the first branches or all the second branches in communication with the two transducers, the amplifiers and the pump thereby to employ them and the recorder in both measurements.

Another objective of the invention is to have all the switch means electrically operated and responsive to a single control ensuring the proper position of every valve for either type of measurement.

In the accompanying drawings, there is shown an illustrative embodiment of the invention from which these and other of its objectives, novel features, and advantages will be apparent.

In the drawings:

FIGURE 1 is a schematic view of an instrument in accordance with the invention adjusted for use in measuring nasal air resistance, FIGURE 2 is a like view with the instrument adjusted for total respiratory air resistance measurements, and FIGURE 3 is a diagrammatic view illustrating the circuitry by which the adjustments are effected in the alternative.

As the components of the instrument are well known, the instrument is schematically illustrated to simplify the disclosure.

A first transducer 5 has first and second conduits 6 and 7, respectively, and is operative to convert the pressure differential exerted through them into electrical signals which are fed by a circuit 8, provided with an amplifier 9, to the X-axis of the oscilloscope 10. The conduit 6 has first and second branches 6A and 6B, respectively, controlled by the valve 6C. The conduit 7, similarly, has first and second branches 7A and 7B, respectively, controlled by the valve 7C.

A second transducer 11 has first and second conduits 12 and 13, respectively, and, like the transducer 5, it is operative to convert the difference in the pressures therein into electrical signals. These are fed, via the circuit 14, wherein they are amplified by the amplifier 15, to the Y-axis of the oscilloscope 10. The conduit 12 has first and second branch conduits 12A and 12B, respectively, controlled by the valve 12C. The conduit 13, similarly, has first and second branch conduits 13A and 13B, respectively, controlled by the valve 13C.

A vacuum pump 16, which may be of the blower type, has its inlet 17 provided with a port 18 controlled by a needle valve 19 and includes first and second branches 17A and 17B, respectively, controlled by a valve 17C. The inlet 17 also has a restriction 20 and on opposite sides of it there are branch conduits 20A and 20B to a differential pressure gauge 21 which functions as a flow meter.

A generally indicated mask 22 is provided for use when the instrument is for use in measuring nasal air resistance.

The mask 22 is shown as of the full face type having a face-engaging rubber gasket 22A and translucent front 22B, Plexiglas for example. The front 22B has an inlet in the form of a first pneumotachograph 23. The branch 13A of the second transducer 11 extends through the front 22B and is provided with a pressure sensing probe 24 disposed to be so held in the mouth of a patient as to be responsive to the pressure in the nasopharynx area 25. The lips of the patient must be held against the probe to block mouth breathing and it will be noted that considerable space is provided between the face of the mask and the face of the patient to avoid such interference with air flows as would affect the validity of the measurement. The branch 17A is also in communication with the interior of the mask 22. If a mask, such as a modified diver's mask, is used instead of a full face mask, thus to enable the then freely movable probe to be positioned by the investigator where he wants it, the above mentioned fit requirements must be observed.

A generally indicated mouthpiece 26 is provided for use when total respiratory resistance is to be measured and a second pneumotachograph 27 is interposed between it in a conduit 28 in which a speaker 29, such as a woofer speaker, is located. The speaker 29 is driven by a sine wave generator 30 in a circuit 31 also including an amplifier 32. The conduit 28 has an air inlet 33. For the functioning of this part of the instrument, reference is made to "Partioning of Respiratory Flow Resistance in Man," B. C. Ferris, Jr., J. Mead and L. M. Opie, Applied Physiology, 1964, vol. 19, No. 4, pp. 653–658; and "Oscillation Mechanics of Lungs and Chest in Man," by A. B. DuBois, A. W. Brody, F. M. Lewis, and B. J. Burgess, Jr., Applied Physiology, 1956, vol. 8, pp. 587–594.

The branch 6B of the first transducer 5 opens into the conduit 28 adjacent the second pneumotachograph 27 and the branch 7B is in communication with the other side of the pneumotachograph 27. The branch 12B of the second transducer 11 is in communication with the mouthpiece 26, desirably as close to the position of the lips of the patient as is possible. The branch 13B has a valve 34 normally open to atmosphere.

The valves 6C, 7C, 12C, 13C, and 17C have two positions. In one position of the valves, see FIGURE 1, they place the branches 6A and 7A in communication with the first transducer 5, the branches 12A and 13A in communication with the second transducer 11, and the branch 17A in communication with the intake side of the pump 16, as is required when the instrument is to be used in measuring nasal resistances.

Air-flow through the nasal passages is provided by the nasal respiration of the patient and resistance measurements can be made during either or both inspiration and expiration. The first pneumotachograph 23 and the first pressure transducer 5 function as a flow meter as the pressure difference between the inside and the outside of the mask 22 is proportional to the flow. The pressure loss, due to nasal resistance, is the pressure differential between the nasopharynx area and the inside of the mask 22 as determined by the second transducer 11.

At this point, it is to be noted that it is necessary to so ventilate the interior of the mask 22 as to prevent the patient from re-breathing expired air and to prevent condensation on the pneumotachograph 23. This is accomplished by adjusting the flow rate effected by the vacuum pump 16 to 1800 liters per hour, for example, by adjustments of the needle valve 19 with the flow meter 21 enabling appropriate adjustments to be accurately made, to 1% or less, for example. This flow is a "bias" flow as it causes a constant pressure drop relative to opposite sides of the first pneumotachograph 23. The resulting constant electrical signal from the transducer 5 can be readily suppressed.

In the other position of the valves 6C, 7C, 12C, 13C, and 17C, see FIGURE 2, the branches 6B and 7B are placed in communication with the first transducer 5, the branches 12B and 13B are in communication with the second transducer 11 and the branch 17B is in communication with the inlet of the vacuum pump 16. The patient wears a nose clamp 35 to prevent any nasal respiration. The respiratory flow is measured by means of the first transducer 5 since the pressure drop across the second pneumotachograph is proportional to the flow. As in the case of nasal resistance measurements, a bias flow is provided by the vacuum pump 16 to minimize re-breathing expired air and condensation in the second pneumotachograph 27, a rate, for example, of 1800 liters per hour being provided. In practice, the resulting constant signal is suppressed. The pressure variations are measured close to the mouth by the second transducer 11, atmospheric pressure being used as a reference.

In practice, the two pneumotachographs are not identical in their response. The constant bias flow provided by the vacuum pump 16 can be used to calibrate both of them for flow purposes. In the case of the calibration of the pneumotachograph 23, the face mask is closed, as by fitting it to a dummy, and conducting the bias flow through the mask. In the calibration of the pneumotachograph 27, the bias flow is adjusted with the mouthpiece 26 closed. One of the pneumotachographs, usually the pneumotachograph 23, is "trimmed" by adding or subtracting resistance until both give the same pressure drop with identical air flows.

For pressure calibrations, the pump motor and the generator circuits are opened. The valve 34 in the branch 13B is closed and the branch 13B is connected to the conduit 13 of the second transducer 11. It will be noted that the branch 13B also has a differential pressure gauge 36 and a bellows 37 by which a known pressure can be applied to one side of the transducer 11 and the resulting current flow measured.

In practice, the valves 6C, 7C, 12C, 13C, 17C, and 34 are electrically operated, as by solenoids, and each has one position effected by the energization of its solenoid and another position when that solenoid is de-energized, this energized position being indicated by solid lines and the de-energized position being indicated by broken lines in FIGURE 3, the lines showing the flow paths through the valves.

In FIGURE 3, circuitry is shown as including a lead 39 controlled by a switch 40 having an open position and a first operative position in which it connects the lead 39 to the lead 41 and a second operative position in which it connects the lead 42 thereto. The lead 42 includes the solenoid of the valve 34 and the valve 34 is normally open and is closed when its solenoid is energized. As the valve 34 is closed only for pressure calibrations purposes, the second operative position of the switch 40 is the pressure calibrating position.

The lead 41 is connected to the lead 43 to the audio amplifier 32 and includes a generally indicated switch 44 including two sections 45 and 46 indicated as being connected to be operated together. Each section of the switch 44 has three positions represented by contacts identified by the suffix additions A, B, and C to the reference numeral for that section.

In nasal air resistance measurements, the switch sections are positioned to engage the contacts 45A and 46A of the leads 47 and 48, respectively. The lead 47 includes the solenoid of the valve 13C and the lead 48 includes the motor of the pump 16 and the contact 46C. As indicated in FIGURE 3, the valves 6C, 7C, 12C, 17C, and 34 are all in the positions they assume when their solenoids are de-energized as will be apparent from FIGURE 3. The contacts 45B and 46B indicate an open or standby position in which the pump motor and all the solenoids of the valves are de-energized.

When the switch 44 is so positioned that its sections 45 and 46 engage the contacts 45C and 46C, respectively, the solenoids of the valves 6C, 7C, 12C, and 17C are all energized by means of the common lead 49 thereby to place them in their FIGURE 2 positions as is required by total respiratory air resistance measurements, the solenoid of the valve 13C now being de-energized.

It will be apparent from the foregoing that instruments in accordance with the invention are well adapted to meet the requirements of use and service and afford substantial economies since most of the expensive components are brought into service in both types of measurements.

I claim:

1. In an instrument for measuring alternatively, nasal air and total respiratory air resistances, a mask including an inlet in the form of a first pneumotachograph; a mouthpiece, means to generate and deliver to said mouthpiece, pressure oscillations at the approximate resonant frequency of the respiratory system, and a second pneumotachograph between said means and said mouthpiece; first and second differential pressure transducers each having first and second conduits and operable to convert variations in the air pressure in said conduits into electrical signals, a recorder, first and second circuits, each circuit including an amplifier, the first circuit being connected to the first transducer and to said recorder to deliver signals to one channel of said recorder and the second circuit being connected to the second transducer and to the recorder to deliver signals to the other channel of the recorder, a pump, the intake of said pump including first and second branches and valve means in control thereof, each transducer conduit including first and second branches and valve means in control thereof, the first and second branches of the first conduit of the first transducer being in communication respectively, with the interior of the mask and the side of the second pneumotachograph adjacent said generating means, the first and second branches of the second conduit of the first transducer being, respectively, open to atmosphere and in communication with the other side of the second pneumotachograph, the first and second branches of the first conduit of the second transducer being in communication, respectively, with the interior of the mask and the mouthpiece, the first branch of the second conduit of the second transducer including an oral probe and the second branch thereof being open to atmosphere, and the first and second branches of the pump inlet being in communication, respectively, with the interior of the mask and the mouthpiece side of the second pneumotachograph, the valve means including positions placing either all the first branches or all the second branches in communication with said transducers and said pump, said pump maintaining a positive flow through whichever branch of its inlet is placed in communication therewith by its valve means in control thereof.

2. The instrument of claim 1 in which the pump has a valve controlled inlet port.

3. The instrument of claim 1 in which the pump has an inlet including a valve controlled inlet port and a flow meter.

4. The instrument of claim 1 in which all of the valve means are electrically operated.

5. The instrument of claim 1 in which the second branch of the second conduit of the second transducer includes a pressure gauge, a bellows, and a normally open valve.

6. The instrument of claim 1 in which each of the valve means includes a solenoid operable when energized to move the valve into a second position from a normal first position, a first lead including the solenoid of the valve means in control of the branch of the second conduit of the second transducer, said valve means normally effecting communication between the second branch thereof and the second transducer, a second lead including all the other valve means, a third lead including the motor of the pump and normally connecting the second branch of the second conduit and the sec-  each of said other valve means normally effecting communication between the appropriate conduit and the second branch thereof, and switch means in control of the leads operable between three positions, one for each solenoid lead and an intermediate position in which both solenoid leads are open, the third lead being closed except in the intermediate valve position.

7. The instrument of claim 6 in which the second branch of the second conduit of the second transducer includes a valve that is normally open and includes a solenoid operable to close it and the switch means includes a fourth lead connected to that solenoid.

8. The instrument of claim 7 in which the switch means for the fourth lead is operable to disconnect the other three leads when the fourth lead is connected thereto.

9. The instrument of claim 8 and a fifth lead to the audio amplifier, said fifth lead and the switch means for the second and third leads being in circuit together.

References Cited

UNITED STATES PATENTS

| 2,089,432 | 8/1937 | Ryan. | |
| 2,749,908 | 6/1956 | Lee et al. | 128—2 |
| 3,232,288 | 2/1966 | Krobath | 128—2.08 |

FOREIGN PATENTS

| 566,752 | 4/1958 | Belgium. |
| 1,176,312 | 8/1964 | Germany. |
| 129,788 | 5/1959 | U.S.S.R. |

OTHER REFERENCES

Journal of Applied Physiology, 1964, vol. 19, No. 4, pp. 653–658.

Journal of Applied Physiology, 1956, vol. 8, No. 6, pp. 587–594.

RICHARD A. GAUDET, *Primary Examiner.*

K. L. HOWELL, *Assistant Examiner.*